United States Patent [19]

Dowd

[11] 4,242,293

[45] Dec. 30, 1980

[54] PAPER PLATE FORMING METHOD AND APPARATUS

[75] Inventor: Daniel J. Dowd, Williamsport, Pa.

[73] Assignee: Westvaco Corporation, New York, N.Y.

[21] Appl. No.: 81,263

[22] Filed: Oct. 2, 1979

[51] Int. Cl.[3] ........................ B29C 17/00; B29C 3/00; B28B 9/28

[52] U.S. Cl. .................................. 264/40.7; 264/160; 425/305.1

[58] Field of Search ............... 264/40.7, 160; 425/302, 425/305.1, 157

[56] References Cited

U.S. PATENT DOCUMENTS

| | | | |
|---|---|---|---|
| 2,900,665 | 8/1959 | Walker | 425/305.1 X |
| 3,359,600 | 12/1967 | O'Brien et al. | 425/157 |
| 3,521,323 | 7/1970 | Hesch | 425/305.1 |
| 3,671,163 | 6/1972 | Griner et al. | 425/305.1 X |
| 3,709,643 | 1/1973 | Nasica | 264/160 X |

*Primary Examiner*—J. Howard Flint, Jr.
*Attorney, Agent, or Firm*—W. Allen Marcontell; Richard L. Schmalz

[57] ABSTRACT

Machinery for three dimensionally forming register cut paper articles such as plates, bowls and saucers is operated with a single, register controlled material supply web and a 2:1 cyclic speed differential between the blank cutting station and the hot forming press. Rotational drive speed of the machine is set and limited by the cycle rate of the hot forming press but two or more, register cut product units are cut and stacked from a single ply, registered controlled web supply within a single cycle interim of the forming press. Consequently, the speed limiting step of the entire machine continues, with a single ply web supply to operate with a high percentage of maximum productivity.

7 Claims, 2 Drawing Figures

PAPER PLATE FORMING METHOD AND APPARATUS

BACKGROUND OF THE INVENTION

1. Field of the Invention

The present invention relates to the art of paper manufactures and converting of paper products. More specifically, the present invention relates to the art of converting paper flatware.

2. Description of the Prior Art

The present state-of-the-art process and apparatus for manufacturing paper plates and other paper flatware relies upon a process step series performed upon paperboard of 0.014 inch or more caliper paper by a multiple work station machine such as that illustrated by FIG. 1 of the drawing. A reeled web 10 of such paper W at one end of the machine provides a continuous material supply into the first machine work station 30 which is a cutter of the reciprocating die and anvil type. With each reciprocation cycle of the die 31, an increment W' of web length driven by an upstream drive station 20 passes between the withdrawn die pressure foot 32 and anvil 33. As the cutter drive shaft 38 rotatively advances the reciprocation eccentric 35, a shearing knife 34 along the in-feed edge of the resiliently mounted pressure foot 32 severs web increment W' from the supply continuum.

Further into the reciprocation cycle, the circular perimeter of die 31 shears a flat disc shape D between the face edge corner of such die and the end corner of a diematching anvil cylinder. The resulting disc D which constitutes a plate blank falls internally through the anvil 33 cylinder onto a slide-way 36 for advancement to the next machine work station whereas the remaining trim T of web increment W' is pushed or falls onto a disposal conveyor 37 when released by the cyclically withdrawn pressure foot 32.

In the case of prior art machines, the disc slideway 36 guides the discs D directly into a heated forming press 40.

Like the cutting die 30, the forming press 40 comprises a stationary anvil 41 having a recess or concavity formed therein. Although not illustrated in detail, the concavity shape conforms to the convex or underside face of the plate product.

In reciprocal alignment with the forming anvil 41 is a forming die 42 having a convex pressing face 43 conforming to the upper or concave face of the plate product. This forming anvil 41 is resiliently biased away from the die 42 and against the surface of a cam 44 driven rotatively by drive shaft 45. Rotation of the cam 44 reciprocates the die 42 against the bias of springs 46.

Upon ejection from the forming anvil 41, finished plate P follows a slideway 48 to a vertical stacking station 50.

To multiply the productivity of such aforedescribed paper plate machines, multiple parallel process lines are provided within the same machine frame. Accordingly, a duplex machine would, on the same die frame 30, have two, side-by-side cutting dies 31 for cutting two discs D from a single web increment W' of sufficient width. The parallel, side-by-side discs D would advance together into a pair of side-by-side press die 42 and anvil sets 41.

Although only one reel 10 and feed web W is shown, it is known to simultaneously feed up to four superimposed webs into the machine. Assuming a duplex machine having two cutting and forming lines, a quadra-ply feed web would produce eight plates per cycle. Such multiple feed ply practice is limited, however to non-registered cutting and forming due to the fact that with such an arrangement, positive feed control may be maintained only over the outermost ply in running contact with a register controlled drive wheel 21. Relative slippage will occur between the lower plys to defeat any pre-set registration alignment but of insufficient consequence to an unregistered pattern cut.

If the plate product is to be cut and formed pursuant to a registration aligned pattern such as is required of a concentric rim plate pattern set against a solid color base field, the plate pattern is previously printed on the web in a rectangular pattern of such rims. Across the web W width, the rims are given a lateral or cross-direction center spacing conforming to the lateral center spacing of the side-by-side duplex cutters and forming dies. Longitudinal of the web W, the rim patterns are center spaced to conform with the length of web increment W'. In addition, however, spacing marks, placed with dimensional precision relative to the rim pattern center, are simultaneously printed along the trim edge of web W. Such spacing marks constitute photo-targets for a photosensory controller 22. By well known prior art means, photosensory controller 22 responds to the passage of a spacing mark to control the rotation of drive wheel 21 whereby the correct length of web is displaced by wheel 21 to center the rim pattern between the cutting die 31 and anvil 33 cylinder. Accordingly, the plate blank D emerges from the cutting station 30 with the printed rim pattern positioned in exact concentricity with the circular perimeter of the plate rim.

From the foregoing, it will be noted that maximum machine productivity of a registered pattern is only one fourth that of an unregistered pattern due to an inability to sustain the lower three plys of a quadra-ply web feed line in registration with the cutting die 31.

Conceivably, a two, three or four ply web feed line could be constructed to register control each of the corresponding feed webs. However, the relative product value and market demand rarely justifies such capital expense. Moreover, such a web feed system would require considerably more production floor space to house.

It is, therefore, an object of this invention to at least double the presently available register formed productivity of such aforedescribed machinery without resort to multiple feed web registration control systems.

Another object of this invention is to at least double the productivity of a paper plate forming machine having a registered, single web in-feed.

Another object of the invention is to teach the construction and operation of a paper plate forming machine which may be quickly changed from unregistered multiple-ply web in-feed operation providing a maximum unregistered productivity to a registered single-web operation providing a productivity of approximately half the maximum.

SUMMARY OF THE INVENTION

The above and other objects of the invention arise from notation of the operational circumstance that the maximum speed of a prior art machine is limited by the press forming station due to heat transfer rates. On most products, such maximum rate of press forming is approximately 40 to 45 cycles per minute. Conversely, blank cutting dies have a maximum cycle rate of approximately 80 cycles per minute.

In recognition of these differences between the two primary operating stations of such machines, I have modified such machines for single-ply, registered web production to operate with a cutting cycle rate of twice that of the forming cycle. Blank holding and stacking means are provided in the slideway between the cutting and forming stations to accumulate the product from two cycles of the cutting station for simultaneous processing by a single cycle of the forming station. A quick change gear cluster is provided on the cutter die drive shaft to select between a normal, unregistered product drive ratio of 1:1 between the cutter and forming press and a registered product drive ratio of 2:1. Consequently, with a maximum duplex machine operating rate of 40 cycles per minute determined by the forming station, the machine is capable of a registered plate productivity of 160 units per minute whereas the maximum unregistered production capacity available from a quadra-ply web in-feed remains at 320 units per minute.

BRIEF DESCRIPTION OF THE DRAWING

Relative to the drawing wherein like reference characters designate like or similar elements throughout the two figures of the drawing.

DESCRIPTION OF THE PREFERRED EMBODIMENT

Figure 1:
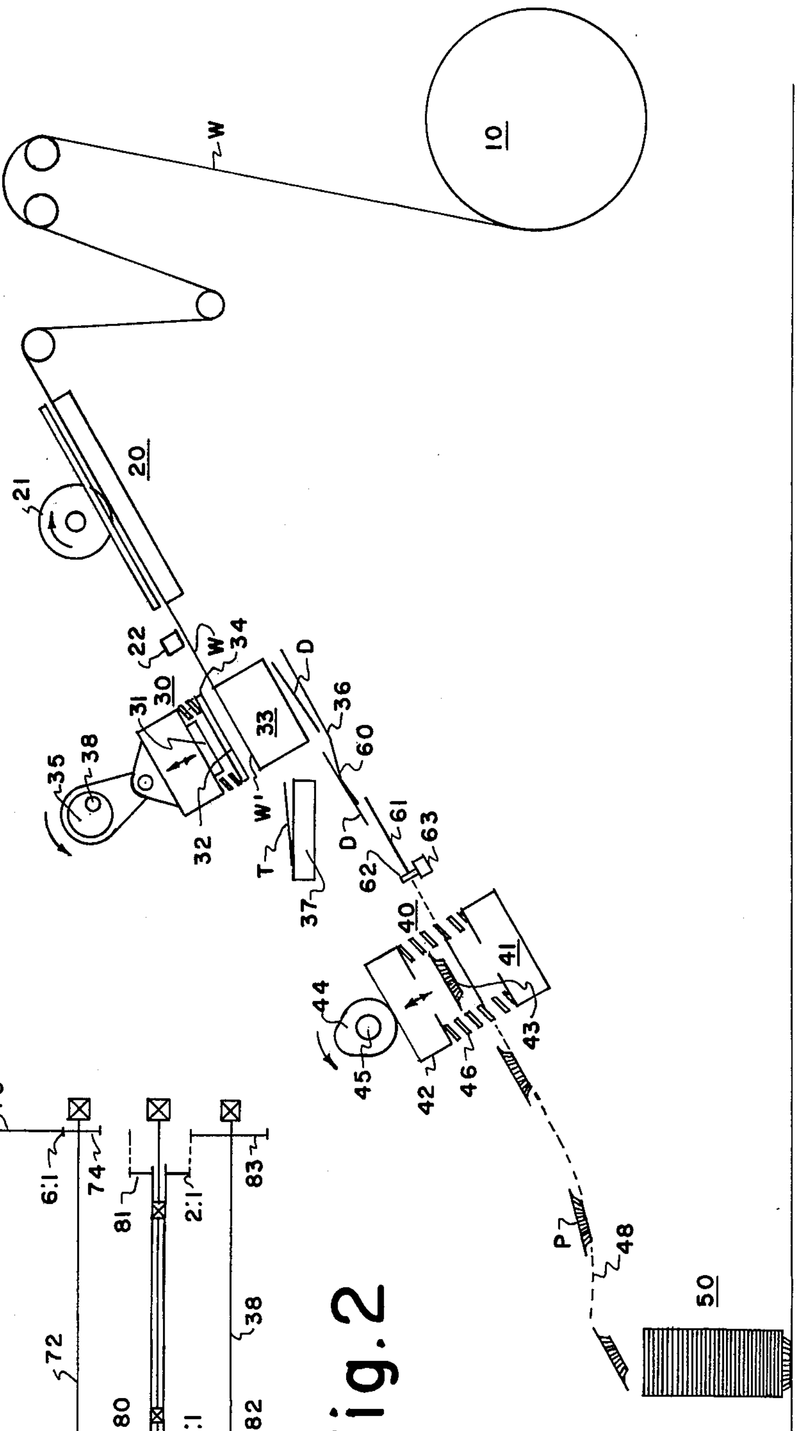
FIG. 1 represents a mechanical process schematic of a plate forming machine as improved by the present invention.

As an improvement over the prior art, the present invention may be operatively integrated with a prior art plate forming machine as previously described relative to FIG. 1. In the slideway 36, between the cutting station 30 and forming station 40 is provided a ramp 60 or slideway discontinuity to lift a subsequently cut blank D above a previously cut one held at a stacked holding station 61 by a removable pin or fence 62. A solenoid 63 energized by a relay not shown responsive to alternate cycles of the forming press 40 releases the accumulated stack of blanks D held at station 61 at the correct moment relative to the forming press 40 operational cycle.

Figure 2:
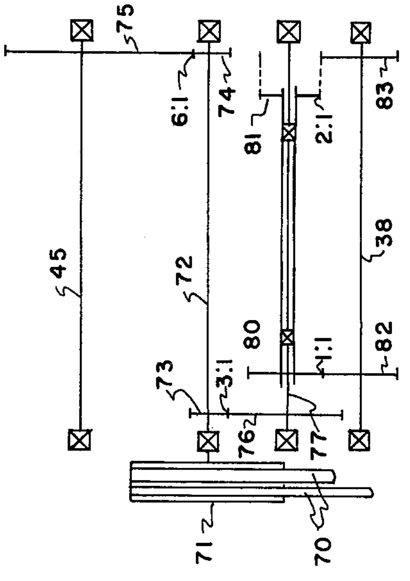
FIG. 2 represents a mechanical drive transmission pursuant to the subject invention.

The drive transmission of the FIG. 1 machine is represented by FIG. 2 wherein drive belts 70 connect power sheave 71 with a variable speed electric motor sheave not shown. Sheave 71 is non-rotatively secured to power input shaft 72 which includes two power delivery gears 73 and 74.

Forming press drive gear 74 engages the press drive shaft 45 driven gear 75 with a direct, 6:1 speed reduction.

Cutter drive gear 73 engages an intermediate reduction gear 76 non-rotatively secured to a transfer shaft 77. A 3:1 reduction ratio between delivery gear 73 and driven gear 76 may be appropriate. A sliding splined connection between the transfer shaft 77 and a concentrically disposed shifting shaft 78 transmits rotative power thereto. At respective ends of shifting shaft 78 are gears 80 and 81 for meshing with respective cutter shaft 38 drive gears 82 and 83. The axial separation between gears 80 and 81 along shifting shaft 78 is less than the axial separation distance between cutter shaft drive gears 82 and 83 so that engagement of one gear set by axially shifting shaft 78 necessarily disengages the other gear set.

An appropriate ratio between gears 80–82 may be 1:1 for an overall rotational ratio of 2:1 between cutter drive shaft 38 and forming press drive shaft 45 to be used with register controlled, single-ply web feed.

Gear set 81–83 may be provided with a 2:1 ratio for an overall ratio of 1:1 between the cutter drive shaft 38 and forming press drive shaft 45 to be used with multiple-ply web infeed production without register control.

Although the invention has been described relative to existing, prior art paper plate forming machinery, it should be apparent that the invention may be applied in modified form to other paper flatware forming machinery such as for bowls and saucers.

Additionally, the invention has been described relative to a machine wherein the maximum cycle rate of the blank cutter 30 is twice that of the forming press 40. Obviously, the invention may also be exploited with 3:1 or higher overall cycle ratios between the cutter and forming press if both the machine and the product will perform at such higher ratios.

Having fully described the basic principles of my invention applications and modifications thereof will be apparent to those of ordinary skill.

I claim:

1. A method of three dimensionally forming articles from paper web drawn from a reeled supply wherein a single ply of such web is cyclically advanced into registered cut position relative to a reciprocating cutting die for production of register cut, article blanks, such blanks being advanced into a heated reciprocating die press for three dimensional shaping into said articles, the improvement comprising the steps of:

A. Driving said cutting die at a reciprocation cycle rate that is at least twice greater than said die press cycle rate;

B. Holding cut article blanks produced within a single cycle interim of said die press in a position clear of said die press; and, C. Simultaneously releasing said held article blanks for simultaneous loading and forming by said die press within a single cycle thereof.

2. An apparatus for converting three dimensionally formed articles from paper web, said apparatus comprising:

reciprocating die cutting means to cut article blanks from a continuous web supply;

register control means to regulate the alignment of printed patterns on said web supply means with said die cutting means;

reciprocating press means to three dimensionally form said blanks; and drive means to cycle said cutting means at least twice greater than the cycle rate of said press means.

3. Apparatus as described by claim 2 comprising holding station means between said cutting means and said press means to stack and restrain the blanks cut by said cutting means during a single cycle interim of said press means.

4. Apparatus as described by claim 2 wherein said drive means comprises an intermediate reduction gear shaft between an input power shaft and a cutter means drive shaft, said intermediate shaft having a pair of axially slidable gears disposed thereon for alternative engagement with a corresponding pair of drive shaft gears, said pair of slidable gears and pair of drive gears constituting first and second gear sets, said first gear set providing a 1:1 cycle ratio between said cutting means and said press means.

5. An apparatus for converting three dimensionally formed articles from paper web comprising register control means to regulate a reeled supply of said web into dimensional alignment with a reciprocating cutting die means to produce article blanks that are cut to edge alignment with patterns printed on said web, said blanks being directed by guide means into reciprocating, heated forming press means for three dimensional forming into said articles, the improvement comprising drive means to cycle said cutting die means at least twice greater than the cycle rate of said press means.

6. An apparatus as described by claim 5 wherein the improvement further comprises restraining means in said guide means to stack and hold those blanks produced by cutting means within a single cycle interim of said press means.

7. An apparatus as described by claim 5 wherein said drive means comprises speed ratio change means for driving said cutting means and press means at a 1:1 cycle ratio in one drive mode and, in another drive mode, cycling said cutting means at a rate at least twice greater than the cycle rate of said press means.

* * * * *